March 29, 1938. W. BAENSCH ET AL 2,112,643
METHOD OF MANUFACTURING METAL CATALYSTS
Filed March 4, 1936 3 Sheets-Sheet 1
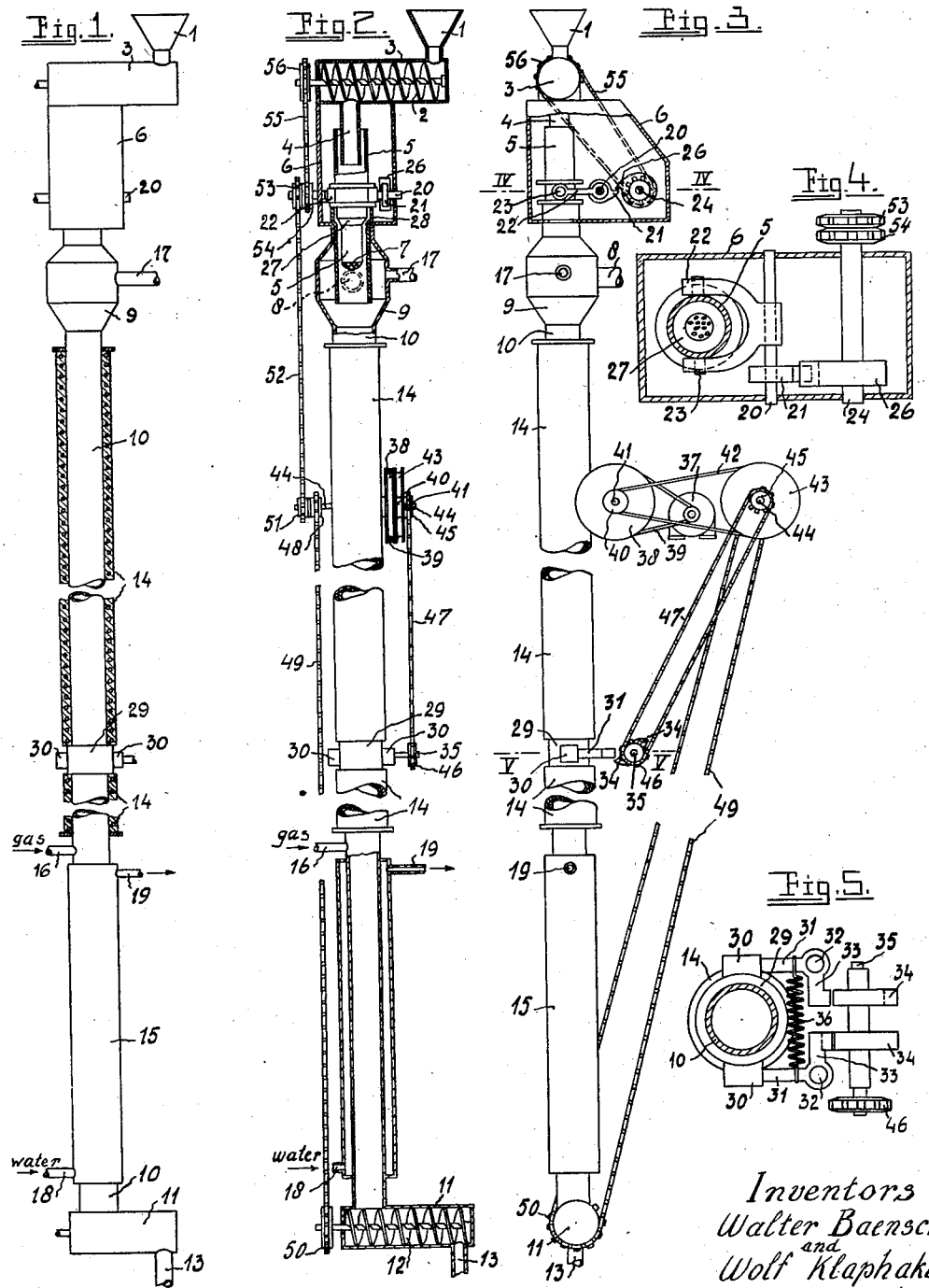
Inventors
Walter Baensch
and
Wolf Klaphake
by Karl Richauer
Atty

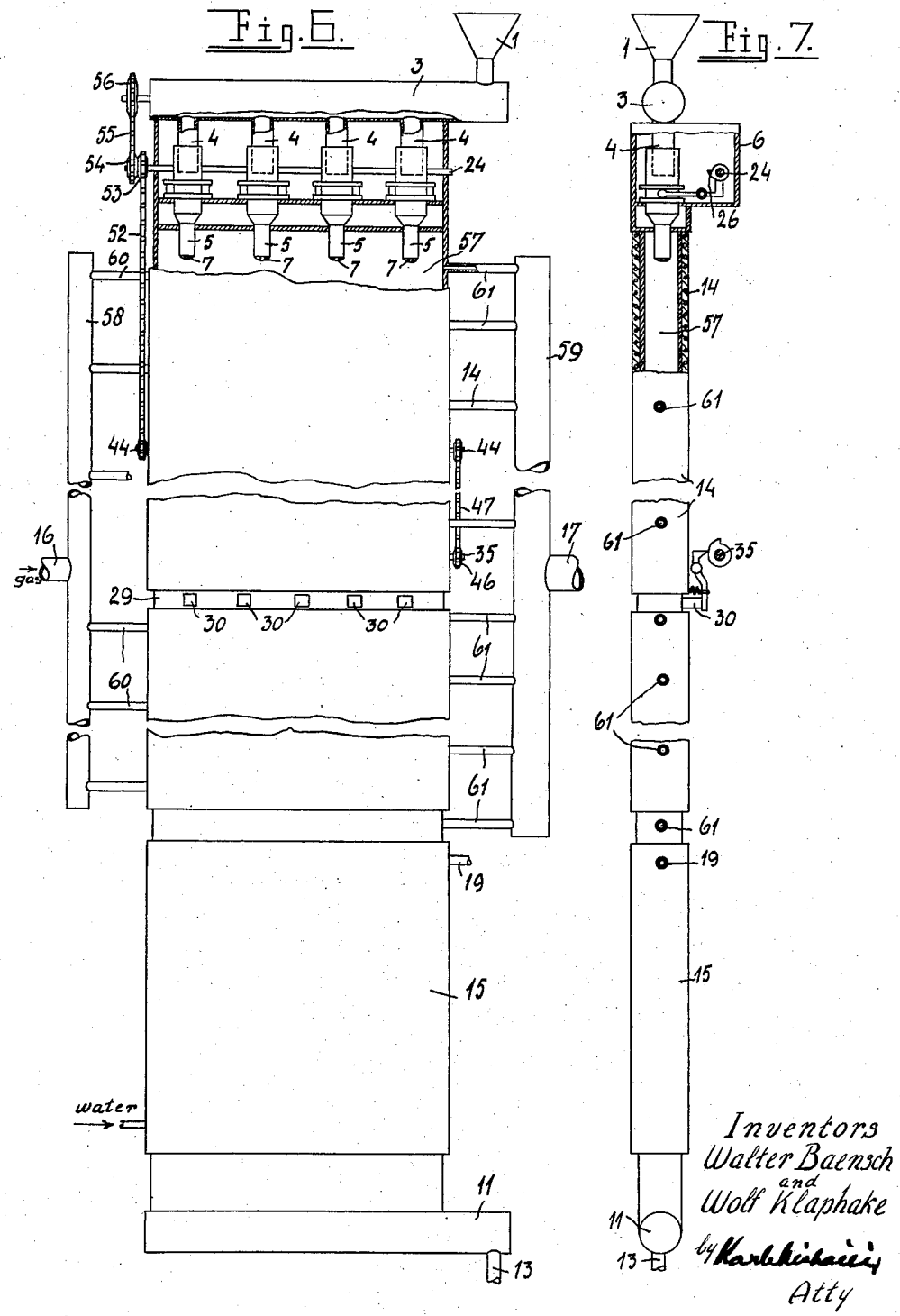

March 29, 1938. W. BAENSCH ET AL 2,112,643
METHOD OF MANUFACTURING METAL CATALYSTS
Filed March 4, 1936   3 Sheets-Sheet 3
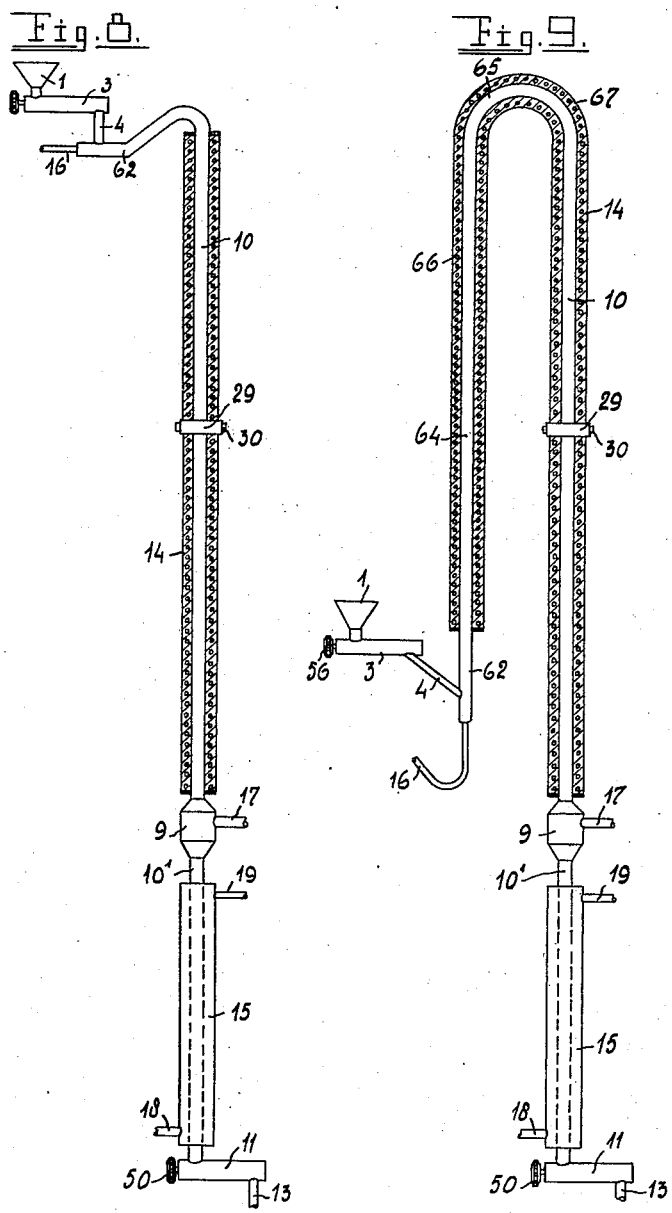
Inventors
Walter Baensch
and
Wolf Klaphake Patented Mar. 29, 1938

2,112,643

UNITED STATES PATENT OFFICE 2,112,643

METHOD OF MANUFACTURING METAL CATALYSTS

Walter Baensch, Muhlheim-on-the-Ruhr, Germany, and Wolfgang Klaphake, Elsternwick, Australia Application March 4, 1936, Serial No. 67,172
In Germany May 5, 1931

8 Claims. (Cl. 23—236)

Our invention relates to the production of suitable metal catalysts from oxides, hydroxides, carbonates of metals or other metal compounds, and more particularly nickel or mixed catalysts such as are used in the hydrogenation of organic compounds including fats, oils, hydrocarbons, heterocyclic compounds, carbon monoxide and the like as disclosed in our application Serial No. 608,466, filed April 30, 1932, now Patent No. 2,048,668, of which this is a continuation in part.

In the manufacture of such catalysts the following points are of importance:

1. The powdered catalyst material to be reduced should be heated to reaction temperature as rapidly and uniformly as possible;

2. The reaction period should be short, i. e. the surface of each particle should be presented to the hydrogen as instantaneously as practicable;

3. The reduced particles should be removed from the hot reaction chamber immediately, and the finished product should be cooled very rapidly.

It is an object of our invention to provide means for producing catalysts which answer the above conditions.

To this end we prefer proceeding as follows:

The powdered material, consisting of oxides, hydroxides, carbonates of metals, or other suitable metal compounds, this material being, if desired, deposited on a carrier substance, is finely distributed, for instance by means of a reciprocating distributor or the like, and passing through a zone filled with hot hydrogen, is reduced therein. The reduced particles descend under their own gravity through a cold gaseous medium such as air in which they are rapidly cooled, and are then collected.

The hydrogen and the reaction material may be made to pass through the apparatus in various ways. For instance they may move in countercurrent, or at right angles to each other, or in concurrent flow. In the last-mentioned case the powder may be entrained by the hydrogen after the manner of an injector. Obviously we may also employ a combination of the several modes of operation referred to.

We thus fulfill the above mentioned conditions and obtain the particular advantage that we can operate in a continuous manner so that only comparatively small quantities of reaction material need be present in the apparatus the size of which is reduced in proportion, so that a high performance is obtained in a comparatively small apparatus.

We obtain the further advantage that the finished catalyst is immediately removed from the reaction chamber without getting into contact with unreduced material.

The hydrogen being gradually consumed in the reduction of the oxides or carbonates under formation of water vapour must be renewed and this is best effected by setting up a slow flow of hydrogen through the apparatus.

It is particularly important that clogging or sticking of the powdered reaction material in the apparatus should be prevented. To this end we provide reciprocating or otherwise movable means for the reception and distribution of the powder and means for shaking them.

In the drawings affixed to this specification and forming part thereof several types of apparatus suitable for use in the operation of our invention are illustrated diagrammatically by way of example. In the drawings.

Figs. 1–5 illustrate an apparatus having a tubular reaction and cooling chamber, with the hydrogen flowing in countercurrent to the descending reaction material, Fig. 1 being a diagrammatic elevation of the complete apparatus, with the heating jacket of the reaction chamber shown in section, while Fig. 2 is an elevation of the apparatus illustrated in Fig. 1, partly in section, Fig. 3 an end elevation of the apparatus illustrated in Figs. 1 and 2, viewed from the right in these figures, and Figs. 4 and 5 are sections on the lines IV—IV and V—V, respectively, in Fig. 3.

Figs. 6 and 7 illustrate an apparatus of which the reaction and cooling chambers have rectangular cross section, the hydrogen flowing transversely to the descending reaction material, Fig. 6 being an elevation of the apparatus, with its reaction chamber partly in section, and Fig. 7 a side elevation of the apparatus viewed from the right in Fig. 6, also with its reaction chamber partly in section.

Figs. 8 and 9 are partly sectional elevations of apparatus in which the reaction material is entrained by the hydrogen, Fig. 8 showing an apparatus in which the mixture of material and hydrogen is injected at the upper end of a descending pipe or reaction chamber, while Fig. 9 shows an apparatus in which the mixture is injected at the lower end of a rising pipe whose upper end is connected to the upper end of a descending pipe, both these pipes forming part of a reaction chamber.

Referring to the drawings and first to Figs. 1-5, 1 is a hopper for the reception of the dry and powdered reaction material, 2 is a screw conveyor in a casing 3 to which the hopper is connected at one end, and 4 is a discharge pipe extending downwardly from the casing 3 at its other end.

5 is a caster which is mounted to reciprocate in a box 6 below the conveyor casing 3, with the discharge pipe 4 extending into its upper end, and 7 is a screen at the lower end of the caster 5. The caster is reciprocated axially by means which will be described below, so that the powder descending through the screen 7 is distributed very finely. 8 is a short pipe surrounding the lower end of the caster 5, 9 is a chamber surrounding the lower end of the pipe 8, and 10 is a vertical reaction pipe which is connected to the chamber 9 at its upper end and to the casing 11 of a second screw conveyer 12 at its lower end. 13 is a discharge pipe on the casing 11 for ejecting the finished catalyst. 14 is a heating jacket here shown as an electric resistance heater, which surrounds the upper portion of the reaction pipe 10, and 15 is a cooling jacket surrounding its lower portion. The pipe 10 may be subdivided into an upper heated, and a lower cooled portion. 16 is a hydrogen supply pipe which is arranged below the lower end of the heating jacket 14, and 17 is a discharge pipe which is connected to the chamber 9 for removing the mixture of hydrogen, water vapour, oxygen and carbon dioxide resulting from the reaction of the hydrogen with the powder. The hydrogen may be heated before being admitted to the pipe 10. The heated particles descend through the pipe 10 and are cooled by the cooling jacket 15 in which a suitable cooling liquid, normally water, flows, 18 being the inlet and 19 being the outlet pipe for the cooling liquid. The cooled and finished catalyst is delivered to the casing 11 at the lower end of the pipe 10 and ejected through the pipe 13 by the conveyer 12.

The means for reciprocating the caster 5 will now be described. 20 is a cam shaft which is mounted to rock in the box 6, 21 is a cam on the shaft, 22 is a fork which is secured to the rocking shaft 20 at one end, while its arms engage trunnions 23 on the caster 5. 24 is a shaft which is mounted to rotate in the box 6, and 26 is a cam on the shaft 24 which, as the shaft rotates, strikes the cam 21 once per revolution, alternately raising and releasing the caster 5. 27 is a seating face on the caster and 28 is a seat at the upper end of the pipe 8. It will be understood that when the caster 5 has been raised in the manner described and is then released by the cams 21, 26, it will return to its seat 28 with a jerk by gravity so that the powder is agitated and distributed in the caster and clogging of the screen 7 is prevented.

In order to prevent the sticking of particles to the pipe 10, means are provided for tapping the pipe. 29 is an annular anvil which is shown as mounted on the pipe 10 near the lower end of the heating jacket 14 but may be arranged in any other suitable position, and 30, 30 are a pair of hammers adapted to strike the anvil 29. Each hammer, Fig. 5, is secured to one leg 31 of a bell-crank lever which is fulcrumed at 32, with its other leg 33 projecting into the path of a cam 34 on a shaft 35. 36 is a spring which tends to pull together the legs 31 of the two levers so as to apply the hammers 30 to the anvil 29. The other bell-crank lever, with its cam 34, is an exact duplicate of the lever and cam which have been described, but the camming members of the cams are pitched at an angle of 180 degs. as shown in Fig. 3.

When the shaft 35 rotates, its cams 34 alternately move the legs 33 of the respective bell-crank levers toward the pipe 10, at intervals corresponding to angles of 180°, putting tension on the spring 36 which as soon as the corresponding leg 33 has been released by its cam, applies the corresponding hammer 30 to the anvil 29 with a sharp blow.

Preferably the driving mechanism is so designed that the operation of the apparatus is perfectly automatic and it requires only recharging of the hopper 1 for its operation. 37 (Fig. 3) is a source of power here shown as an electric motor, 38 is a pulley which is rotated by the motor at a reduced rate through the medium of a belt 39, 40 is a pulley of smaller diameter on the shaft 41 of pulley 38 and 42 is a belt which extends from the pulley 40 to a pulley 43 on a driving shaft 44. Obviously any other means than the belts and pulleys illustrated may be provided for rotating the driving shaft 44 from the engine or motor 37 at the required velocity. 45 is a sprocket on the driving shaft 44 which is connected to a sprocket 46 on the hammer shaft 35 by a chain 47. 48 is a second sprocket on the driving shaft 44 from which a chain 49 extends downwardly to a sprocket 50 on the shaft of the helical conveyer 12 at the discharging end of the apparatus. 51 is a third sprocket on the driving shaft 44 on which a chain 52 extends to a sprocket 53 on the cam shaft 24 for reciprocating the caster 5. 54 is a second sprocket on the shaft 24, and 55 is a chain extending from the sprocket 54 to a sprocket 56 on the shaft of the charging helical conveyer 2. By these means the operation of the apparatus becomes quite automatic.

Referring now to Figs. 6 and 7, these illustrate apparatus designed substantially on the lines of the apparatus described with reference to Figs. 1-5 and operated in a similar manner, but in which the hydrogen instead of flowing in countercurrent to the powdered material flows transversely to it. The pipe 10 is here replaced by a chamber 57 of rectangular section, and four casters 5, each supplied from a discharge pipe 4, are arranged side by side at the upper end of the chamber 57. Obviously any number of casters may be provided instead of four, and we are not limited to chambers of rectangular section.

The hydrogen supply pipe 16 and the gas discharge pipe 17 are here connected to headers 58 and 59, respectively. 60 are distributing pipes extending from the inlet header 58 to the chamber 57, and 61 are corresponding pipes extending from the chamber 57 to the discharge header 59. As the volume of the gas is larger at the discharge than at the inlet side, the discharge header 59 has a larger inside diameter than the header 58, and more pipes 61 are provided than there are pipes 60.

The operation of the apparatus is the same as described with reference to Figs. 1-5, but by causing the hydrogen to flow transversely to the descending powdered catalyst, an even more intimate mixture of the hydrogen and the catalyst particles is effected than by the countercurrent flow in the apparatus illustrated in Figs. 1-5.

Instead of allowing the powder to descend by gravity while the hydrogen flows in countercurrent or transversely to the descending powder particles as shown in Figs. 1–5, and Figs. 6 and 7, respectively, the particles may be entrained by the flowing hydrogen. Apparatus of this type are illustrated in Figs. 8 and 9.

Referring first to Fig. 8, 62 is a nozzle at the upper end of pipe 10 to which nozzle the discharge pipe 4 of the helical conveyer in the casing 3 is connected. Hydrogen is admitted to one end of the nozzle through pipe 16, entrains the catalyst from the pipe 4 by injector action, and flows down in pipe 10. The caster or casters 5 have not been shown but may be provided if desired for shaking the powder before it is entrained by the hydrogen jet. The heating jacket 14 and the anvil 29 with its hammers 30 are provided on the pipe 10, as and for the purpose specified. The chamber 9 to which the gas-discharge pipe 17 is connected, must in this system obviously be arranged at the lower end of the pipe 10. The cooling jacket 15 is placed on an extension 10' of the pipe 10. The helical conveyer the casing of which is indicated at 11 at the lower end of the pipe extension 10' is provided as described above.

Fig. 9 illustrates an apparatus in which the mixture of hydrogen and powder first flows upwardly and thereupon downwardly. The pipe 10 and the parts connected to it are arranged as described with reference to Fig. 8, but the hydrogen supply pipe and the nozzle 62 with the supply hopper and the conveyer casing 3 are arranged below the upper end of the pipe 10. 64 is a rising pipe to the lower end of which the nozzle 62 is connected, and 65 is a bend which connects the upper end of the rising pipe 64 to the upper end of the pipe 10. Heating jackets 66 and 67 may be provided on the pipes 64 and on the bend 65, respectively. In an apparatus arranged as illustrated in Fig. 9 the effective length is increased without increasing the overall length.

The mechanism for operating the apparatus has not been shown in full detail in Figs. 6–9, but it is understood that any suitable mechanism may be provided and that the mechanism is preferably automatic as illustrated in Figs. 1–5.

Instead of providing a single pipe or chamber in which the reaction, the heating and the cooling occur, as shown, we may provide separate pipes or chambers for the heating and the reaction, and for the cooling of the finished catalyst. Nor is it necessary that the pipes or chambers should be connected. For instance, in the apparatus illustrated in Figs. 6 and 7, we might provide an upper box or casing with an open bottom for the reaction and another box or casing with an open top for the reception and cooling of the finished catalyst.

In practising our invention we may for instance proceed as follows:

*Example 1.*—Into a solution of 126 grams ammonium bichromate in 500 ccms. water are introduced under stirring about 125 ccms. of concentrated ammonia, until the orange color of the solution has changed to yellow. After cooling there is added a solution of 240 grams nitrate of copper in 300 ccms. water. The metal hydroxides formed in the reaction are filtered by suction, washed, dried at 100° C., are powdered, sifted and carefully heated in a porcelain dish until the powder is capable of being shifted in stirring after the manner of a thin fluid. After cooling, the black powder is digested with a 10% acetic acid solution, filtered by suction, washed and dried at 100° C.

The finely sifted metal oxides are now subjected to reduction at 450° C. in an apparatus of the kind described above, after the air in the apparatus has been displaced by carbon dioxide and this latter gas by hydrogen. After reduction and rapid cooling the catalyst is caught in a vessel such as a Woulfe bottle airtightly connected with the bottom end of the apparatus, from which, after the reduction has come to an end, the hydrogen is expelled by carbon dioxide. Withdrawal of the catalyst from this vessel is effected by adding to the catalyst the solution to be reduced and washing the whole into the autoclave in which the reduction shall take place.

*Example 2.*—156 grams nitrate of nickel, 12.5 grams nitrate of cobalt and 74 grams nitrate of copper are dissolved in two litres water and in the solution heated to 70° C., the metal carbonates are precipitated within about an hour under stirring by adding a 10% solution of carbonate of soda. The precipitated carbonates are filtered by suction, washed to remove all the acid, dried at 80° C., ground and sifted. They are subjected to reduction at a temperature ranging between 250 and 300° C. in one of the apparatus described above, and in the manner described with reference to Example 1.

*Example 3.*—25 grams finely sifted silica gel are suspended in a solution of 145 grams nitrate of nickel in 500 ccms. water. The suspension is heated to 70° C. and within eight hours there is added under stirring a solution of 53 grams soda in 1½ litres water. The carbonate of nickel deposited on the carrier substance is filtered by suction, washed with water of 70° C. to free it from acid, and dried at 80° C. After grinding and sifting it is subjected to reduction at 500° C. in one of the apparatus above described for the preparation of the catalyst.

We wish it to be understood that we do not desire to be limited to the exact details of construction shown and described for obvious modifications will occur to a person skilled in the art.

We claim:—

1. The method of producing metal catalysts which comprises causing a material comprising a metal compound capable of being reduced to metal to pass, while being in a state of fine division suspended in gas, through a zone of hot hydrogen in motion and in order to be cooled down materially, in a freely falling manner, through a cold gas.

2. The method of producing metal catalysts which comprises moving an oxygen compound of the metal, while being in a state of fine division suspended in gas, in contact with a current of hot hydrogen and causing the reduced material, in order to be cooled down materially to descend in a freely falling manner through a zone of cold gas.

3. The method of producing metal catalysts which comprises moving an oxygen compound of the metal, while being in a state of fine division suspended in gas, countercurrent to and in contact with hot hydrogen and causing the material thus treated, in order to be cooled down materially to drop in a freely falling manner through a zone of cold gas.

4. The method of producing a metal catalyst which comprises reacting ammonium chromate with nitrate of copper for the production of a mixture of the oxides of the metals, conducting the oxides, while being in a state of fine division suspended in gas, in contact with a current of hot hydrogen and thereafter causing the material thus treated to drop in a freely falling manner through a zone of cold gas.

5. The method of producing a metal catalyst which comprises preparing a mixture of the carbonates of nickel, cobalt and copper, conducting said carbonates, while being in a state of fine division suspended in gas, in contact with a current of hot hydrogen and allowing the reduced material to drop in a freely falling manner through a zone of cold gas.

6. The method of producing a metal catalyst which comprises depositing carbonate of nickel on silica gel, conducting this material, while being in a state of fine division suspended in gas, in contact with a current of hot hydrogen and causing the reduced material to drop in a freely falling manner through a zone of cold gas.

7. The method of producing metal catalysts which comprises causing a material comprising a metal compound capable of being reduced to metal to pass, while being in a state of fine division suspended in gas, through a zone of hot hydrogen in motion and in order to be cooled down materially, in a freely falling manner, through a cooling chamber.

8. The method of producing metal catalysts which comprises causing a material comprising a metal compound capable of being reduced to metal to pass, while being in a state of fine division suspended in gas, through a zone of hot reducing gas in motion and in order to be cooled down materially, in a freely falling manner, through a cold gas.

WALTER BAENSCH.
WOLFGANG KLAPHAKE.